US011396052B2

(12) United States Patent
Taguchi

(10) Patent No.: US 11,396,052 B2
(45) Date of Patent: Jul. 26, 2022

(54) TURRET TOOL HOLDER

(71) Applicants: CITIZEN WATCH CO., LTD., Nishitokyo (JP); CITIZEN MACHINERY CO., LTD., Kitasaku-gun Nagano (JP)

(72) Inventor: Noriyoshi Taguchi, Tokorozawa (JP)

(73) Assignees: CITIZEN WATCH CO., LTD., Nishitokyo (JP); CITIZEN MACHINERY CO., LTD., Kitasaku-gun Nagano (JP)

( * ) Notice: Subject to any disclaimer, the term of this patent is extended or adjusted under 35 U.S.C. 154(b) by 406 days.

(21) Appl. No.: 16/632,439

(22) PCT Filed: Jun. 13, 2018

(86) PCT No.: PCT/JP2018/022633
§ 371 (c)(1),
(2) Date: Jan. 20, 2020

(87) PCT Pub. No.: WO2019/044117
PCT Pub. Date: Mar. 7, 2019

(65) Prior Publication Data
US 2020/0406369 A1    Dec. 31, 2020

(30) Foreign Application Priority Data
Aug. 28, 2017   (JP) .............................. JP2017-163647

(51) Int. Cl.
*B23B 29/32* (2006.01)
*B23Q 16/10* (2006.01)
(Continued)

(52) U.S. Cl.
CPC .............. *B23B 29/323* (2013.01); *B23Q 5/10* (2013.01); *B23Q 5/326* (2013.01); *B23Q 5/348* (2013.01);
(Continued)

(58) Field of Classification Search
CPC ............. Y10T 29/5155; Y10T 29/5167; Y10T 29/5165; Y10T 74/1494; B23B 29/32;
(Continued)

(56) References Cited

U.S. PATENT DOCUMENTS 5,072,636 A * 12/1991 Gueli ................... B23Q 16/102
                                                                   82/159
5,842,392 A * 12/1998 Pfeifer ................... B23Q 16/06
                                                                   82/120
(Continued)

FOREIGN PATENT DOCUMENTS

EP        2316598 A1    5/2011
JP     2001179511 A    7/2001
(Continued)

OTHER PUBLICATIONS

Sep. 4, 2018, International Search Report issued in the International Patent Application No. PCT/JP2018/022633.
(Continued)

*Primary Examiner* — Erica E Cadugan
(74) *Attorney, Agent, or Firm* — Kenja IP Law PC

(57) ABSTRACT

A turret tool holder includes an engagement means having engaging elements on a turret side and a support base side, a clutch member for transmitting a driving power to a turret drive section, and a moving mechanism. The moving mechanism includes a rotatably supported drive shaft, a first feed screw mechanism and a second feed screw mechanism rotatable in response to the rotational drive of the drive shaft for moving the clutch member and the engagement elements, and a coordination mechanism arranged between the drive shaft and the first feed screw mechanism or the second feed screw mechanism, for moving the engaging elements in response to the rotational drive of the drive shaft, with a feed amount smaller than the feed amount of the clutch member.

12 Claims, 4 Drawing Sheets

(51) Int. Cl.
*B23Q 5/10* (2006.01)
*B23Q 5/40* (2006.01)
*B23Q 5/32* (2006.01)
*B23Q 5/34* (2006.01)

(52) U.S. Cl.
CPC ...... *B23Q 16/102* (2013.01); *B23Q 2220/002* (2013.01); *B23Q 2705/185* (2013.01); *B23Q 2716/02* (2013.01); *Y10T 29/5155* (2015.01); *Y10T 29/5167* (2015.01)

(58) Field of Classification Search
CPC ............... B23B 29/323; B23Q 16/102; B23Q 2220/002
USPC ................... 29/40, 48.5 R, 48.5 A; 74/813 L
See application file for complete search history.

(56) References Cited

U.S. PATENT DOCUMENTS

| | | | | |
|---|---|---|---|---|
| 6,016,729 | A | * | 1/2000 | Pfeifer ................. B23B 29/242 |
| | | | | 29/40 |
| 6,257,111 | B1 | * | 7/2001 | Shinohara ............... B23B 3/162 |
| | | | | 29/40 |
| 6,609,441 | B1 | | 8/2003 | Sugimoto et al. |
| 8,893,362 | B2 | * | 11/2014 | Aoyagi ................ B23Q 16/102 |
| | | | | 29/40 |

FOREIGN PATENT DOCUMENTS

| | | |
|---|---|---|
| JP | 2002337011 A | 11/2002 |
| JP | 2010052124 A | 3/2010 |
| JP | 5414221 B2 | 2/2014 |
| WO | 9951391 A1 | 10/1999 |

OTHER PUBLICATIONS

Mar. 12, 2021, Office Action issued by the Taiwan Intellectual Property Office in the corresponding Taiwanese Patent Application No. 107121620.
Jan. 6, 2021, Office Action issued by the China National Intellectual Property Administration in the corresponding Chinese Patent Application No. 201880048136.6.
Mar. 3, 2020, International Preliminary Reporton Patentability issued in the International Patent Application No. PCT/JP2018/022633.
Apr. 29, 2021, the Extended European Search Report issued by the European Patent Office in the corresponding European Patent Application No. 18852361.7.

* cited by examiner

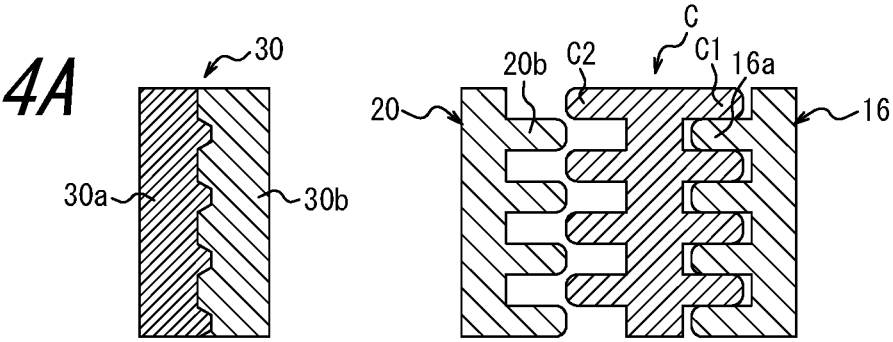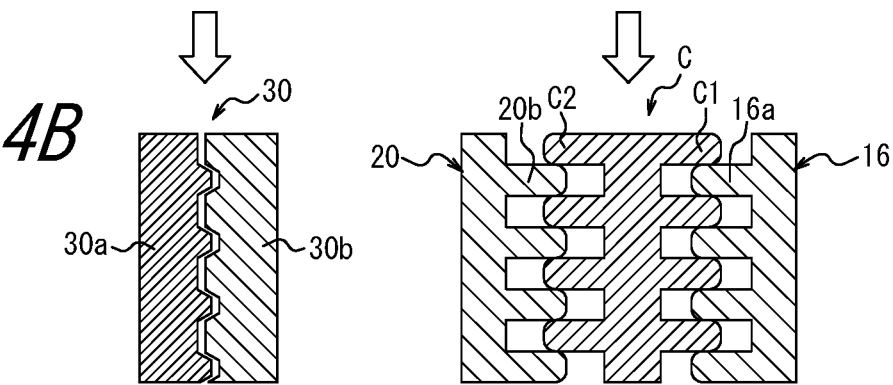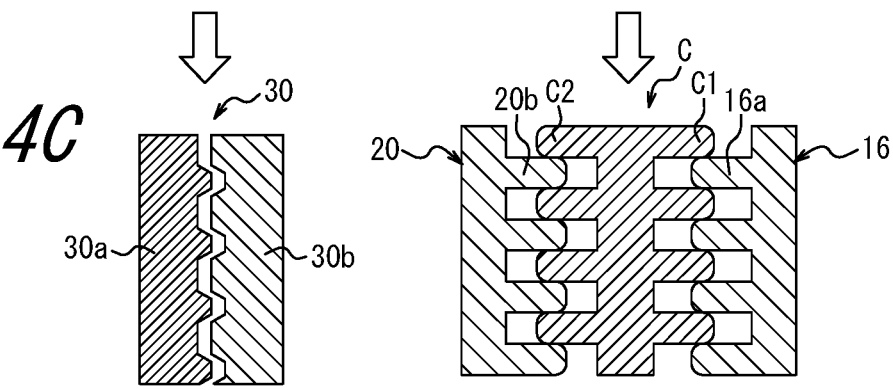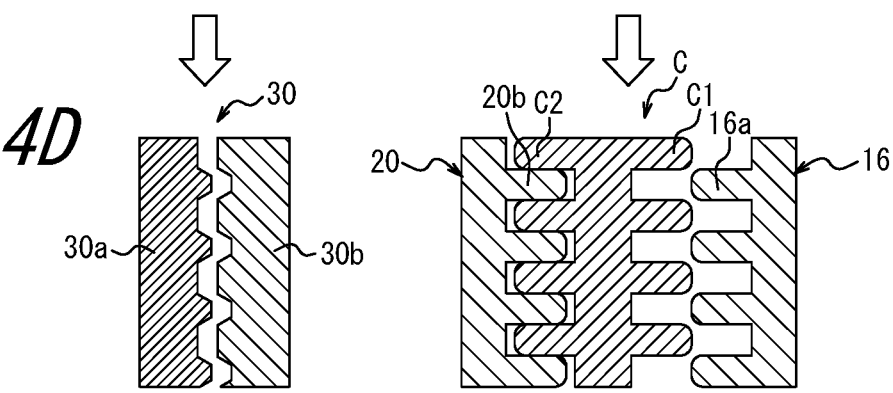

TURRET TOOL HOLDER

TECHNICAL FIELD

The present disclosure relates to a turret tool holder adapted to be installed on a machine tool.

BACKGROUND ART

As a tool holder to be installed on a machine tool such as an NC lathe, in order to enhance automation and to speed up the machining operations, there is known a turret tool holder adapted to hold a number of tools in advance and configured so that a desired tool can be selected and positioned at a machining position of the machine tool by an index-turning motion.

This type of turret tool holder is disclosed, for example, in JP 5,414,221 B2 (PTL 1) wherein the turret tool holder includes a turret rotatably supported by a support base, a turret drive section for rotationally driving the turret, an engagement means for positioning the turret at a predetermined angular position in an engaged state in which an engaging element provided on the turret is engaged with an engaging element provided on the support base, and for allowing rotation of the turret in a disengaged state in which the pair of engaging elements are disengaged from each other, a clutch member adapted to be engaged with a drive section side engaging member provided in the turret drive section for limiting a free rotation of the turret and transmitting the driving power of a servomotor to the turret drive section, and a moving mechanism for converting the rotation of the switching drive shaft that is rotationally driven by the switching power source, into a linear movement by the feed screw mechanism and moving the clutch member, wherein the movement of the linear motion shaft by the feed screw mechanism is transmitted to the engaging element by a lever and the clutch member is engaged with the drive section side engaging body, before the pair of engaging elements of the engagement means are disengaged from each other,
by moving the engaging elements in coordination with the clutch member during the movement of the clutch member, at a speed lower than the moving speed of the clutch member, and the free rotation of the turret is limited by the engagement between the clutch member and the engagement member on the drive section side, before the engagement means is switched from the engaged state to the disengaged state. With such a turret tool holder, when carrying out the index-turning motion of the turret, it is possible to prevent the turret from free rotation to thereby avoid damages to the tools and peripheral devices that may be caused by the rotation of the turret.

CITATION LIST

Patent Literature

PTL 1: JP 5,414,221 B2

SUMMARY

Technical Problem

In the turret tool holder of PTL 1, the displacement of the axially moving linear motion shaft is transmitted to the engaging element by the lever, so that the engaging element is moved at a speed lower than the movement speed of the clutch member, and the clutch member is engaged with the engaging member on the drive section side before the engagement means is disengaged. As a result, there are many design limitations in terms of the arrangement of the lever, for example, and there is in this respect a need for a turret tool holder with a higher degree of freedom.

The present disclosure has been made in view of the above problems, and it is an object to improve the degree of freedom of a turret tool holder capable of preventing unnecessary free rotation of the turret upon the index-turning motion of the turret.

Solution to Problem

The turret tool holder according to the present disclosure includes an engagement means for positioning the turret at a predetermined angular position in an engaged state of engaging elements on the turret side and on a support base side of the turret, and for allowing rotation of the turret in a disengaged state of the both engaging elements, a clutch member engageable with a drive section side engaging body of a turret drive section that rotationally drives the turret, for transmitting a driving power to the turret drive section, and a moving mechanism for moving the engaging element during the movement of the clutch member, in coordination with the clutch member and at a speed lower than the moving speed of the clutch member, such that the clutch member and the drive section side engaging body are brought into an engaged state before the engaging elements are disengaged from each other, and the engagement means is switched to a disengaged state after a free rotation of the turret is restricted, wherein the moving mechanism comprises a rotatably supported drive shaft, a first feed screw mechanism and a second feed screw mechanism rotatable corresponding to the rotational drive of the drive shaft, for moving the clutch member and the engaging element, and a coordination mechanism arranged between the drive shaft and the first feed screw mechanism or the second feed screw mechanism, for moving the engaging element with a feed amount smaller than the feed amount of the clutch member in response to the rotational drive of the drive shaft.

In the turret tool holder according to the present disclosure with the above configuration, the coordination mechanism may include gears adapted to mesh with each other for reducing a feed amount of the second feed screw mechanism with respect to the first feed screw mechanism.

In the turret tool holder according to the present disclosure with the above configuration, the turret drive section may be axially movable together with the engaging element provided on the support base.

The turret tool holder according to the present disclosure with the above configuration may further comprise a tool rotating shaft for rotating the rotating tool mounted on the turret, wherein the tool rotation shaft is configured to move in the axial direction of the turret together with an engaging element provided on the turret, and wherein the clutch member is adapted to be engaged with a tool rotating shaft side engaging body provided on the tool rotating shaft at a position disengaged from the drive section side engaging body, for transmitting the driving power to the tool rotating shaft.

The turret tool holder according to the present disclosure with the above configuration may comprise a rotation-lock means that includes: a rotation-locking portion provided on the support base, and a rotation-locked portion provided on the tool rotating shaft, and engageable with the rotation-locking portion for preventing rotation of the tool rotation shaft when the clutch member is disengaged from the engaging body on the side of the tool rotation shaft.

Advantageous Effect

According to the present disclosure, it is possible to improve the degree of freedom of a turret tool holder capable of preventing unnecessary free rotation of the turret upon index-turning motion of the turret.

BRIEF DESCRIPTION OF THE DRAWINGS

FIGS. 4A-4D are explanatory views illustrating the engaged state of the engagement means and the switching state of the clutch member in a time series manner.

DETAILED DESCRIPTION

Figure 1:
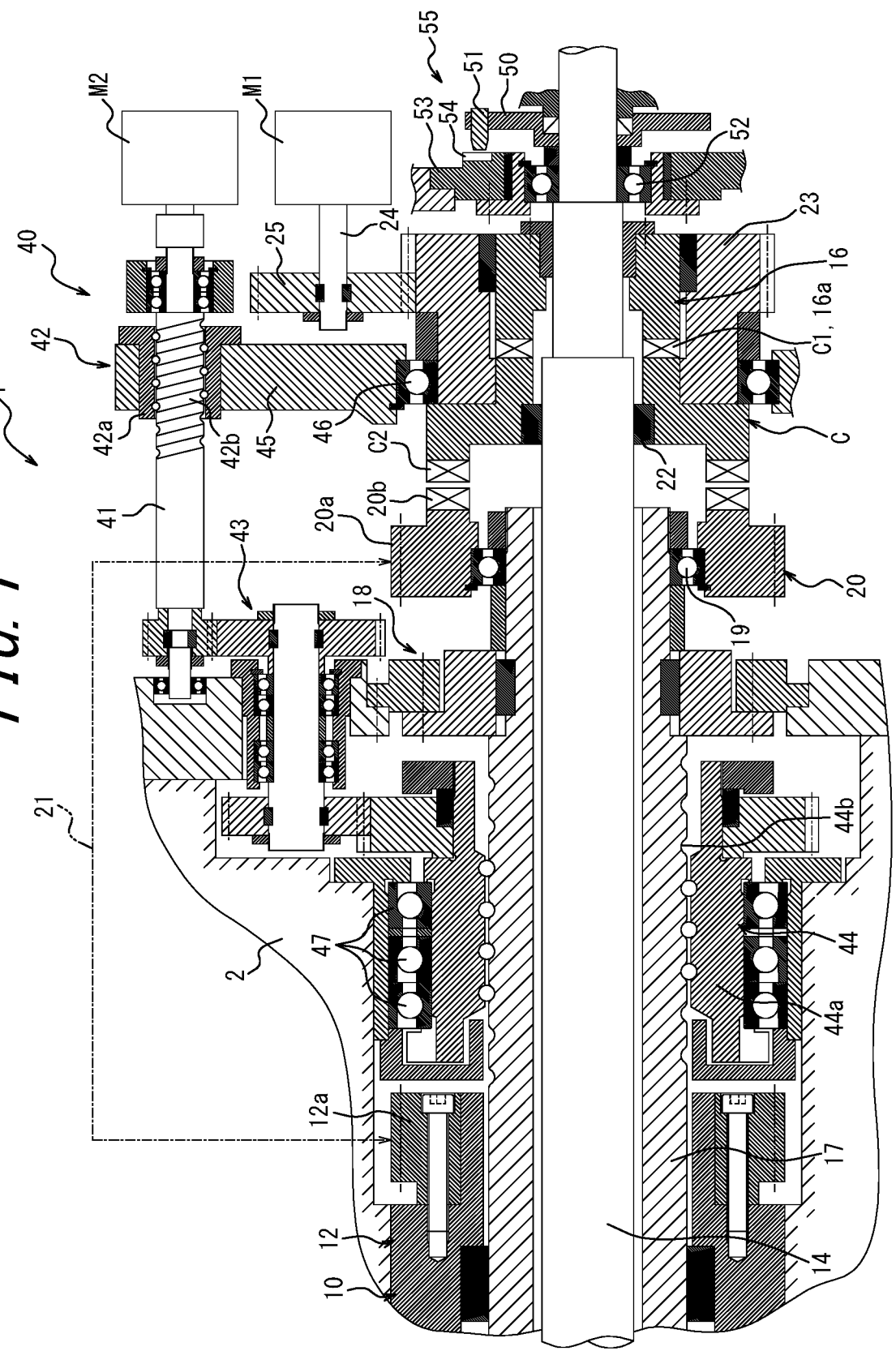
FIG. 1 is a cross-sectional view schematically illustrating the configuration of a turret tool holder according to an embodiment of the present disclosure.
Figure 2:
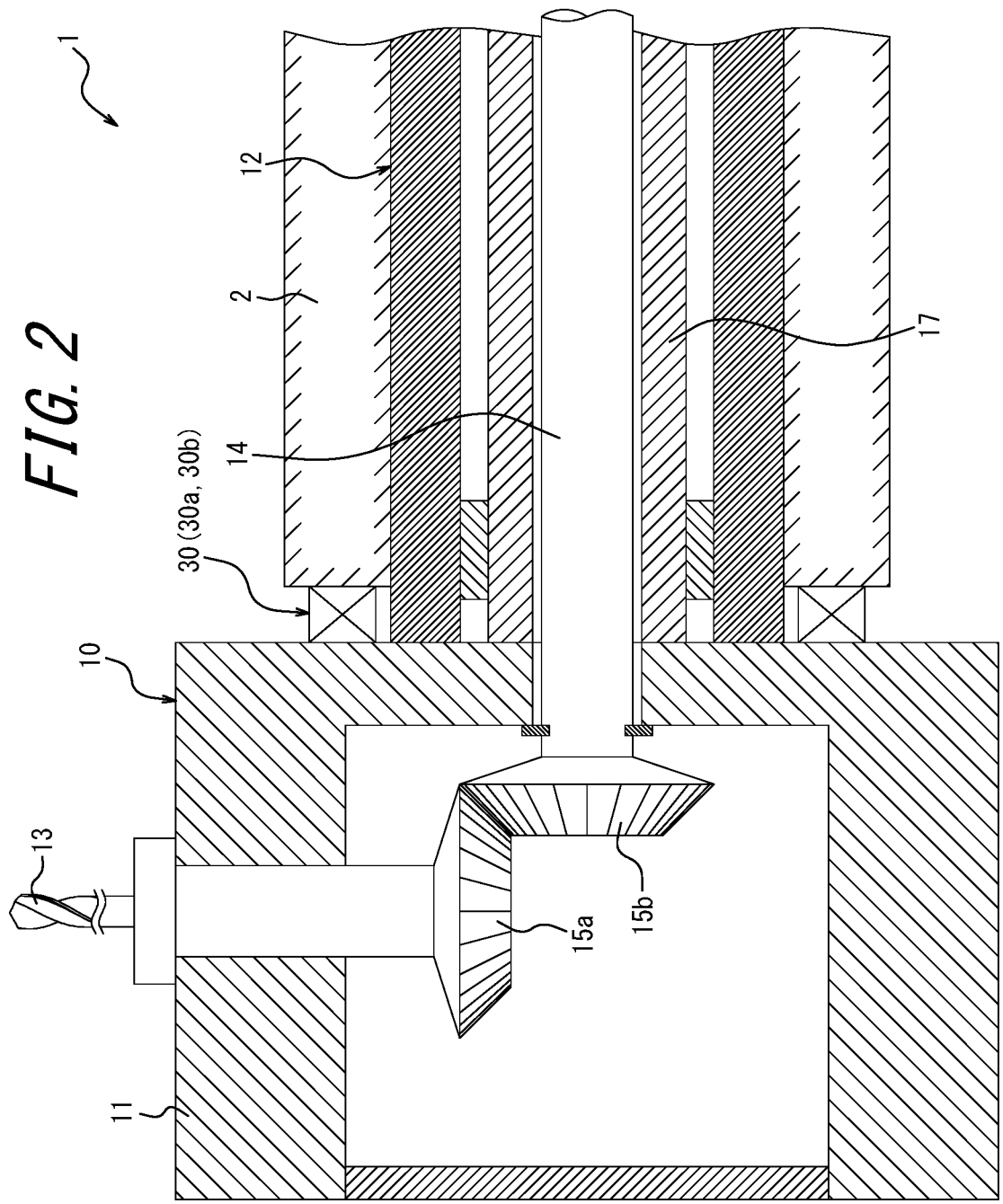
FIG. 2 is a cross-sectional view schematically illustrating the structure of the turret.

A turret tool holder 1 according to an embodiment of the present disclosure is illustrated in FIGS. 1 and 2 as being installed in a machine tool such as an NC lathe. The turret tool holder 1 has a turret 10 that is supported by a support base 2 in a rotatable (turnable) manner.

As illustrated in FIG. 2, the turret 10 includes, by way of example, a hollow turret head 11 having a polygonal outer peripheral surface, as well as a turret turning shaft 12 coaxially connected to one end side of the turret head 11, and is rotatably supported by the support base 2 at the turret turning shaft 12. The turret head 11 is arranged to protrude outward from the front end surface of the support base 2, and to be rotatable (turnable) together with the turret turning shaft 12. Tools may be mounted on the outer peripheral surface of the turret head 11 at predetermined index angles. A fixed tool such as a bite and a rotatable tool such as a drill may be mounted to the turret head 11, though FIG. 2 illustrates a case where the rotatable tool 13 is mounted as a tool.

A tool rotating shaft 14 is rotatably and coaxially arranged inside the turret turning shaft 12. The tip of the tool rotating shaft 14 protrudes into the turret head 11, and the rotating tool 13 is connected to the tool rotating shaft 14 via a pair of bevel gears 15a and 15b for transmitting power. As illustrated in FIG. 1, a tool rotation shaft drive section 16 is fixed to the base end side of the tool rotation shaft 14. The tool rotation shaft drive section 16 can be connected to a servomotor M1 as a driving power source via a clutch member C. When the servomotor M1 is operated with the tool rotating shaft drive section 16 connected to the servomotor M1 via the clutch member C, the tool rotating shaft 14 is rotated by the servomotor M1, and the rotating tool 13 is rotated together with the tool rotating shaft 14.

A cylindrical fixed shaft 17 is arranged between the turret turning shaft 12 and the tool rotation shaft 14. The fixed shaft 17 is supported by a rotation bracket 18 on the support base 2 so that it cannot be rotated around its axis, and integrally movable along the axial direction together with the turret turning shaft 12 and the tool rotating shaft 14.

An input gear 12a is coaxially fixed to the base end side portion of the turret turning shaft 12. On the other hand, a turret drive section 20 is mounted on the base end side portion of the fixed shaft 17 supported by a ball bearing 19. The turret drive section 20 has a substantially cylindrical shape, is disposed coaxially with the fixed shaft 17, and is supported by a ball bearing 19 rotatably with respect to the fixed shaft 17. The turret drive section 20 is fixed in the axial direction with respect to the fixed shaft 17 and moved together with the fixed shaft 17 when the fixed shaft 17 is moved in the axial direction.

An output gear 20a is provided integrally on the outer peripheral surface of the turret drive section 20, and the output gear 20a is connected to the input gear 12a of the turret turning shaft 12 through a gear mechanism 21. The gear mechanism 21 is indicated by a dash-dot line in the drawing, and although not shown in detail, it constitutes a power transmission path together with the input gear 12a and the output gear 20a, for allowing the rotation of the turret drive section 20 to be transmitted to the turret turning shaft 12. As the gear mechanism 21, for example, there may be used a reduction gear mechanism that reduces the rotation of the turret drive section 20 and transmits it to the turret turning shaft 12.

The clutch member C has a substantially cylindrical shape that is coaxial with the turret turning shaft 12 and the fixed shaft 17, and is provided with a first engaging portion C1 at one end in the axial direction (the right end in FIG. 1), and also with a second engaging portion C2 at the other end (the left end in FIG. 1). The first engaging portion C1 and the second engaging portion C2 may be configured, for example. to have teeth and tooth grooves (see FIGS. 4A-4D) extending radially on the axial end surface of the clutch member C. The clutch member C is arranged between the turret drive section 20 and the tool rotation shaft drive section 16, is supported by the slide bearing 22, and extends between the turret drive section 20 and the tool rotation shaft drive section 16 along the fixed shaft 17 so as to be movable in the axial direction.

The axial end surface of the tool rotation shaft drive section 16 facing the clutch member C side is provided with a tool rotation shaft side engaging body 16a (see FIGS. 4A-4D) having teeth and tooth grooves in a shape corresponding to the first engaging portion C1. When the clutch member C is at the position illustrated in FIG. 1 (the stroke end position on the right side in the drawing), the tool rotating shaft side engaging body 16a is engaged with the first engaging portion C1, and the clutch member C is engaged with the tool rotating shaft 14 for allowing power transmission.

The axial end face of the turret drive section 20 facing the clutch member C is provided with a drive section side engagement body 20b (see FIGS. 4A-4D) having teeth and tooth grooves corresponding to the second engagement unit C2. When the clutch member C is in the position illustrated in FIG. 3 (the stroke end position on the left side in the drawing), the drive section side engaging body 20b engages with the second engagement unit C2, and the clutch member C is connected to the turret drive section 20 for transmitting power.

A power input gear 23 is coaxially fixed to the clutch member C, and a power output gear 25 fixed to the output shaft 24 of the servomotor M1 is meshed with the power input gear 23. The power input gear 23 is movable in the axial direction integrally with the clutch member C, and has a tooth width that always meshes with the power output gear 25 regardless of the axial position, so that the driving power of the servomotor M1 can be transmitted to the clutch member C regardless of the axial movement of the clutch member C.

As illustrated in FIG. 2, an engagement means 30 is provided between the turret head 11 and the support base 2 for preventing unnecessary rotation of the turret 10. The engagement means 30 includes a turret-side engaging element 30a provided on the axial end surface of the turret head 11 facing the support base 2, and an engaging element 30b on the axial end surface of the support base 2 facing the turret head 11. The engaging elements 30a and 30b have teeth and tooth grooves (see FIGS. 4A-4D) extending radially outward from the axial center, respectively, on the axial end surfaces. When the turret head 11 is in the position illustrated in FIG. 2 with respect to the support base 2, the engaging element 30a and the engaging element 30b are engaged so as to mesh with each other, so that the turret head 11 is engaged by the support stand 2 via the engagement means 30 and thereby positioned at a predetermined angular position. On the other hand, when the turret head 11 is moved to the left in FIG. 2 along the axial direction together with the turret turning shaft 12, the tool rotating shaft 14 and the fixed shaft 17, as illustrated in FIG. 4D, the engaging element 30a and the engaging element 30b are disengaged from each other and the turret head 11 is allowed to rotate (turn) with respect to the support base 2.

In the disengaged state of the engagement means 30, when the servomotor M1 is operated in a state where the second engaging portion C2 of the clutch member C is engaged with the drive section side engaging body 20b of the turret drive section 20, the turret head 11 can be turned by rotating the turret 10 by means of the turret drive section 20 that is rotationally driven by the servomotor M1. On the other hand, after the turret head 11 has been turned to a predetermined index position, when the turret head 11 is rotated to the right in FIG. 2 along the axial direction together with the turret turning shaft 12, the tool rotation shaft 14 and the fixed shaft 17, as illustrated in FIG. 4A, the engaging element 30a and the engaging element 30b are engaged with each other and the turret head 11 can be positioned at a predetermined angular position.

In the engaged state of the engagement means 30, the clutch member C is moved rightward in FIG. 1 to engage the first engaging portion C 1 with the tool rotating shaft side engaging body 16 a of the tool rotating shaft drive section 16. Then, by actuating the servomotor M1 to rotate the rotatable tool 13, the workpiece can be subjected to turning by the rotatable tool 13 positioned at a predetermined index position.

The movement of the clutch member C in the axial direction and the engagement/disengagement of the engagement means 30 are carried out by the movement mechanism 40. The moving mechanism 40 includes a servomotor (switching power source) M2, a switching drive shaft 41 that is rotationally driven by the servomotor M2, a first feed screw mechanism 42 that converts the rotational motion of the switching drive shaft 41 into a linear movement, and a second feed screw mechanism 44 connected to the switching drive shaft 41 via a reduction gear train (coordination mechanism) 43. In the illustrated embodiment, the first feed screw mechanism 42 and the second feed screw mechanism 44 are comprised of ball screws.

The first feed screw mechanism 42 is configured so that a nut 42a is screw-connected to a screw portion 42b provided on the switching drive shaft 41, and a clutch lever 45 is fixed to the nut 42a. The clutch lever 45 is connected to the clutch member C by a ball bearing 46 at the lower end and is relatively rotatable while being fixed in the axial direction. Since the switching drive shaft 41 is arranged in parallel to the axial direction of the turret turning shaft 12 or the tool rotating shaft 14, when the servomotor M2 is operated to rotate the switching drive shaft 41, the switching drive shaft 41 is driven by the clutch lever 45 that is moved in the axial direction together with the nut 42a, thereby moving the clutch member C in the axial direction. By switching the operating direction of the servomotor M2, the clutch member C can be reciprocated between an axial position where the first engaging portion C1 is engaged with the tool rotating shaft side engaging body 16a for transmitting the driving power of the servomotor M1 to the tool rotating shaft drive section 16 (tool rotation shaft 14), and an axial position where the second engaging portion C2 is engaged with the drive section side engaging body 20b for transmitting the driving power of the servomotor M1 to the turret drive section 20 (turret 10).

The rotation of the switching drive shaft 41 is transmitted to the nut 44a of the second feed screw mechanism 44 after reduction in two stages (for example, a reduction ratio of 1/6) by the reduction gear train 43. The nut 44a is rotatably supported on the support base 2 by three ball bearings 47, is axially immovably positioned on the support base 2, and is screw-connected to a screw portion 44b that is provided on the fixed shaft 17. Thus, when the nut 44a is rotated, the rotation of the nut 44a is converted into an axial linear movement of the fixed shaft 17. Since the fixed shaft 17 is moved in the axial direction together with the turret turning shaft 12, when the fixed shaft 17 is moved in the axial direction, the engaging element 30a on the turret head 11 side of the engagement means 30 also reduce in the axial direction together with the fixed shaft 17.

The second feed screw mechanism 44 has the same screw pitch as that of the first feed screw mechanism 42, though the rotation of the switching drive shaft 41 is reduced and transmitted to the nut 44a, so that the feed amount of the second feed screw mechanism 44 when the switching drive shaft 41 rotates one turn is smaller than the feed amount of the first feed screw mechanism 42 when the switching drive shaft 41 rotates one turn. Thus, when the servomotor M2 is operated to rotate the switching drive shaft 41, the engaging element 30a is moved in the same direction as the clutch member C at a speed lower than the moving speed of the clutch member C.

In the present embodiment, since the turret drive section 20 is mounted on the fixed shaft 17 as being positioned in the axial direction, the turret drive section 20 is moved axially together with the engaging element 30a and the fixed shaft 17, in the same direction as the clutch member C and at a speed lower than the moving speed of the clutch member C. Further, the tool rotating shaft 14 also is moved axially together with the engaging element 30a and the fixed shaft 17, in the same direction as the clutch member C and at a speed lower than the moving speed of the clutch member C.

Figure 3:
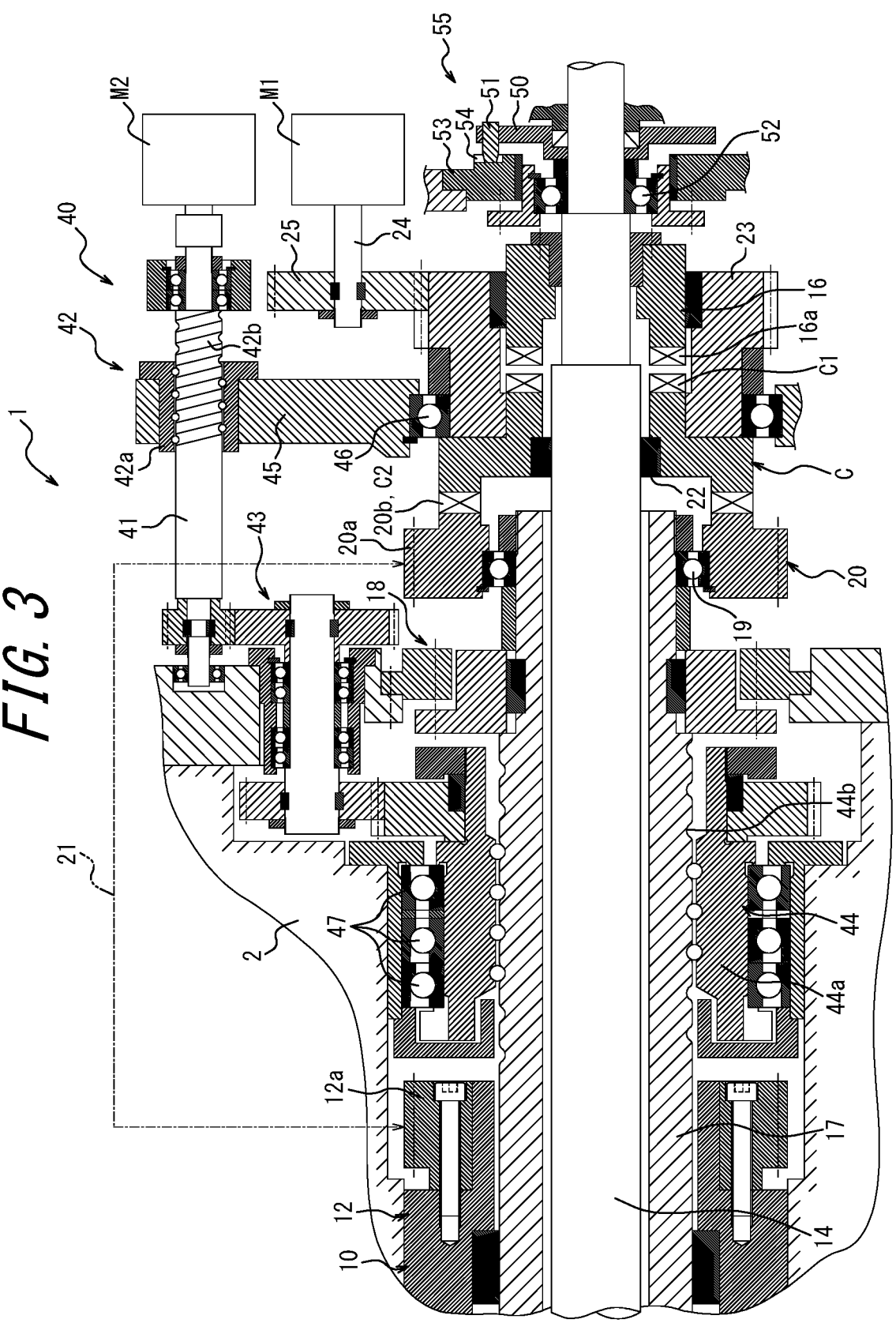
FIG. 3 is a cross-sectional view of the turret tool holder illustrated in FIG. 1 in a state where the engagement means is in a disengaged state and the clutch member is engaged with the drive section side engaging body.

A disc-like member 50 is fixed to the proximal end side of the tool rotating shaft 14, and a pin member (rotation-locked portion) 51 is fixed to the disc-like member 50 to protrude from the disc-like member 50 along the axial direction. The pin member 51 is a tapered pin that decreases in diameter toward the tip. The support base 2 is provided with a support wall 53 that is mounted with a ball bearing 52 that faces the pin member 51 and supports the tool rotating shaft 14, and a portion of the support wall 53 that faces the disc-like member 50 is provided with a groove-shaped rotation-locking portion 54 with a groove width corresponding to the member 51. The pin member 51 and the rotation-locking portion 54 constitute a rotation-lock means 55. In the state where the first engaging portion C1 of the clutch member C is engaged with the tool rotating shaft side engaging body 16a of the tool rotating shaft drive section 16, as illustrated in FIG. 1, the pin member 51 is disengaged from the rotation-locking portion 54 and the tool rotation shaft 14 is allowed to rotate. On the other hand, when the first engaging portion C1 of the clutch member C is disengaged from the tool rotation shaft side engagement body 16a of the tool rotation shaft drive section 16, as illustrated in FIG. 3, the pin member 51 is engaged with the rotation-locking portion 54 so that the tool rotating shaft 14 is locked against rotation.

In the turret tool holder 1 with a configuration as described above, in the state illustrated in FIGS. 1 and 4A, the first engaging portion C1 of the clutch member C is engaged with the tool rotation shaft side engaging body 16a of the tool rotation shaft drive section 16, the second engaging portion C2 is disengaged from the drive section side engaging body 20b of the turret drive section 20, and the engaging elements 30a and 30b of the engagement means 30 are engaged with each other, and the turret head 11 is positioned at a predetermined index position. In this state, by operating the servomotor M1 that is the driving power source, the power of the servomotor M1 is transmitted to the tool rotating shaft 14 via the clutch member C, and the tool 13 positioned at the predetermined index position is rotated to thereby subject the workpiece to turning.

When the turret head 11 is turned to another index position in order to carry out working with another rotatable tool 13, the servomotor M2 as a switching power source is operated from the state illustrated in FIG. 1, and the clutch member C and the engaging element 30a are interlocked and moved in the axial direction by the moving mechanism 40. In the present embodiment, by way of example, when the reduction gear ratio of the gear mechanism 21 is set to 1/6, the moving stroke of the clutch member C due to the movement caused by the rotation of the switching drive shaft 41 is 20 mm, and the moving amount (clamping amount) of the engaging element 30a of the engagement means 30 with respect to the engaging element 30b is 4 mm.

On this occasion, since the engaging element 30a and the turret drive section 20 are moved in the same direction as the clutch member C at a speed lower than the moving speed of the clutch member C, as illustrated in FIG. 4B, while the engaging elements 30a and 30b are kept engaged with each other, the second engaging portion C2 of the clutch member C is engaged with the drive section side engaging body 20b of the turret drive section 20. Thus, as illustrated in FIG. 4C, when the engaging elements 30a and 30b are disengaged from each other, the second engaging portion C2 of the clutch member C is already in the drive section side engaging body of the turret drive section 20 so that even when the engaging elements 30a and 30b are disengaged from each other, the free rotation of the turret 10 is restricted by the turret drive section 20 being connected to the servomotor M1 via the clutch member C. When the state illustrated in FIG. 4D is reached, the second engaging portion C2 of the clutch member C is completely engaged with the drive section side engaging body 20b of the turret drive section 20, and the first engaging portion C1 of the clutch member C is disengaged from the tool rotating shaft side engaging body 16a of the tool rotating shaft drive section 16 to complete the movement. Since the operations illustrated in FIGS. 4A to 4D are typically carried out with the servomotor M1 stopped, the first engaging portion C1 of the clutch member C may be engaged with the tool rotating shaft side engaging body 16a of the tool rotating shaft drive section 16 in the state of FIGS. 4B and 4C.

As described above, the turret tool holder 1 of the present embodiment is configured so that, when the turret head 11 is turned to another index position, the second engaging portion C2 of the clutch member C is engaged with the drive section side engaging body 20b of the turret drive section 20 before the engaging elements 30a and 30b are disengaged from each other. Thus, the turret 10 is locked against unnecessary free rotation of the turret 10, when carrying out the index-turning of the turret 10, to prevent free rotation and thereby improving the stability of the operation and avoid damage to the tools and peripheral devices that might otherwise be caused due to rotation of the turret 10. Further, the moving mechanism 40 is configured to include a first feed screw mechanism 42 for converting the rotational motion of the servomotor M2 into a linear movement and transmitting it to the clutch member C thereby moving the clutch member C, and a second feed screw mechanism 44 for converting the rotational motion of the servomotor M2 into a linear movement with a feed amount smaller than the feed screw mechanism 42 and moving the engaging element 30a at a speed lower than the clutch member C. Thus, as compared with the conventional turret tool holder in which the displacement of the moving linear motion shaft is transmitted to the engaging element by to lever, it is possible to facilitate the arrangement of the moving mechanism 40 and increase the degree of freedom in designing the turret tool holder 1.

In the turret tool holder 1 of the present embodiment, the rotation-lock means 55 for the tool rotating shaft 14 is provided so that when, as illustrated in FIG. 3, the first engaging portion C1 of the clutch member C is disengaged from the tool rotation shaft side engaging body 16a of the tool rotating shaft drive section 16, the pin member 51 of the rotation-lock means 55 is engaged with the rotation-locking portion 54 to thereby prevent the tool rotation shaft 14 from rotation. By preventing the tool rotating shaft 14 from rotation, the rotatable tool 13 can be rotated freely together with the tool rotating shaft 14 when the turret head 11 is turned toward a predetermined index position in the disengaged state of the engagement means 30.

The present disclosure is not limited to the embodiment described above, and various modifications may be made without departing from the scope of the disclosure.

In the embodiment described above, the first feed screw mechanism 42 and the second feed screw mechanism 44 have the same screw pitch, and the rotation of the switching drive shaft 41 is reduced by the reduction gear train 43 and transmitted to the nut 44a so as to make the feed amount of the second feed screw mechanism 44 smaller than the feed amount of the first feed screw mechanism 42. However, the feed amount of the second feed screw mechanism 44 may be made smaller than the feed amount of the first feed screw mechanism 42 without using the reduction gear train 43, by changing the screw pitch between the first feed screw mechanism 42 and the second the feed screw mechanism 44. Also, the feed amount of the second feed screw mechanism 44 may be made smaller than the feed amount of the first feed screw mechanism 42 using both the reduction gear train 43 and different screw pitches.

In the embodiment described above, the rotation-lock means 55 is configured by the groove-shaped rotation-locking portion 54 provided on the support wall 53 and the pin member 51 engageable with the rotation stop portion 54. However, provided that the tool rotating shaft 14 can be locked against rotation when the tool rotating shaft 14 is moved together with the engaging element 30*a* and the first engaging portion C1 is disengaged from the tool rotating shaft side engaging body 16*a* of the tool rotating shaft drive section 16, other configurations such as a meshing clutch or a brake may be adopted as the rotation-lock means 55.

REFERENCE SIGNS LIST

1 Turret tool holder
2 Support stand
10 Turret
11 Turret head
12 Turret turning shaft
12*a* Input gear
13 Rotatable tool
14 Tool rotation shaft
15*a* Bevel gear
15*b* Bevel gear
16 Tool rotation shaft drive section
16*a* Tool rotation shaft side engaging body
17 Fixed shaft
18 Rotation locking bracket
19 Ball bearing
20 Turret drive section
20*a* Output gear
20*b* Drive section side engaging body
21 Gear mechanism
22 Slide bearing
23 Power input gear
24 Output shaft
25 Power output gear
30 Engagement means
30*a* Engaging element
30*b* Engaging element
40 Moving mechanism
41 Drive shaft for switching
42 First feed screw mechanism
42*a* Nut
42*b* Screw portion
43 Reduction gear train (coordination mechanism)
44 Second feed screw mechanism
44*a* Nut
44*b* Screw portion
45 Clutch lever
46 Ball bearing
47 Ball bearing
50 Disc-shaped member
51 Pin member (rotation-locked portion)
52 Ball bearing
53 Supporting wall
54 Rotation-locking portion
55 Rotation-lock means
C Clutch member
C1 First engaging portion
C2 Second engaging portion
M1 Servomotor (driving power source)
M2 Servomotor (switching power source)

The invention claimed is:

1. A turret tool rest including:
a tool turret;
an engagement means comprising: (i) a first engaging element provided on the tool turret, and (ii) a second engaging element provided on a support base on which the tool turret is supported, where when the first and second engaging elements are engaged with one another, the tool turret is positioned at a predetermined angular position, and wherein when the first and second engaging elements are disengaged from one another, rotation of the tool turret is allowed;
a clutch member engageable with a drive section engaging body of a turret drive section that rotationally drives the turret, such that when the clutch member is engaged with the drive section engaging body, a driving power is able to be transmitted to the turret drive section; and
a moving mechanism for moving the first engaging element, during and in coordination with movement of the clutch member, at a lower speed than the moving speed of the clutch member, such that the clutch member and the drive section engaging body are brought into an engaged state before the engaging elements are disengaged from each other, and such that the engagement means is switched to a disengaged state at which the engaging elements are disengaged from one another after a free rotation of the turret has been restricted,
wherein the moving mechanism comprises:
a rotatably supported drive shaft comprising a first feed screw portion;
a first feed screw mechanism comprising the first feed screw portion, wherein the first feed screw portion is driven, as a result of rotation of the drive shaft, for moving the clutch member;
a second feed screw mechanism comprising a second feed screw that is driven, as a result of the rotation of the drive shaft, for moving the first engaging element; and
a coordination mechanism arranged between the drive shaft and the second feed screw mechanism, for moving the first engaging element in response to the rotation of the drive shaft, with a feed amount smaller than a feed amount of the clutch member.

2. The turret tool holder according to claim 1, wherein the coordination mechanism includes gears adapted to mesh with each other for reducing a feed amount of the second feed screw mechanism with respect to a feed amount of the first feed screw mechanism.

3. The turret tool holder according to claim 2, wherein the turret drive section is linearly movable together with the first engaging element.

4. The turret tool holder according to claim 3, wherein a rotating tool is mounted on the tool turret, the turret tool holder further comprising a tool rotating shaft for rotating the rotating tool,
wherein the tool rotating shaft and the first engaging element are configured to move in a direction of a rotation axis of the turret, and
wherein the clutch member is adapted to be engaged with a tool rotating shaft engaging body provided on the tool rotating shaft at a time when the clutch member has been disengaged from the drive section engaging body, such that driving power can be transmitted to the tool rotating shaft.

5. A turret tool holder according to claim 4, further comprising a rotation-lock means that includes:
a rotation-locking portion provided on the support base; and
a rotation-locked portion provided on the tool rotating shaft, and engageable with the rotation-locking portion for preventing rotation of the tool rotating shaft when the clutch member is disengaged from the tool rotating shaft engaging body.

6. The turret tool holder according to claim 2, wherein a rotating tool is mounted on the tool turret, the turret tool holder further comprising a tool rotating shaft for rotating the rotating tool, wherein the tool rotating shaft and the first engaging element are configured to move in a direction of a rotation axis of the turret, and wherein the clutch member is adapted to be engaged with a tool rotating shaft engaging body provided on the tool rotating shaft at a time when the clutch member has been disengaged from the drive section engaging body, such that driving power can be transmitted to the tool rotating shaft.

7. A turret tool holder according to claim 6, further comprising a rotation-lock means that includes:

a rotation-locking portion provided on the support base; and a rotation-locked portion provided on the tool rotating shaft, and engageable with the rotation-locking portion for preventing rotation of the tool rotating shaft when the clutch member is disengaged from the tool rotating shaft engaging body.

8. The turret tool holder according to claim 1, wherein the turret drive section is linearly movable together with the first engaging element.

9. A turret tool holder according to claim 8, wherein a rotating tool is mounted on the tool turret, the turret tool holder further comprising a tool rotating shaft for rotating the rotating tool, wherein the tool rotating shaft and the first engaging element are configured to move in a direction of a rotation axis of the turret, and wherein the clutch member is adapted to be engaged with a tool rotating shaft engaging body provided on the tool rotating shaft at a time when the clutch member has been disengaged from the drive section engaging body, such that driving power can be transmitted to the tool rotating shaft.

10. A turret tool holder according to claim 9, further comprising a rotation-lock means that includes:

a rotation-locking portion provided on the support base; and a rotation-locked portion provided on the tool rotating shaft, and engageable with the rotation-locking portion for preventing rotation of the tool rotating shaft when the clutch member is disengaged from the tool rotating shaft engaging body.

11. The turret tool holder according to claim 1, wherein a rotating tool is mounted on the tool turret, the turret tool holder further comprising a tool rotating shaft for rotating the rotating tool, wherein the tool rotating shaft and the first engaging element are configured to move in a direction of a rotation axis of the turret, and wherein the clutch member is adapted to be engaged with a tool rotating shaft engaging body provided on the tool rotating shaft at a time when the clutch member has been disengaged from the drive section engaging body, such that driving power can be transmitted to the tool rotating shaft.

12. A turret tool holder according to claim 11, further comprising a rotation-lock means that includes:

a rotation-locking portion provided on the support base; and a rotation-locked portion provided on the tool rotating shaft, and engageable with the rotation-locking portion for preventing rotation of the tool rotating shaft when the clutch member is disengaged from the tool rotating shaft engaging body.

* * * * *